US011044186B2

(12) United States Patent
Perraud et al.

(10) Patent No.: US 11,044,186 B2
(45) Date of Patent: Jun. 22, 2021

(54) TECHNOLOGIES FOR LINK CAPABILITY ESTIMATION

(71) Applicant: INTEL CORPORATION, Santa Clara, CA (US)

(72) Inventors: Eric Perraud, Plaisance-du-Touch (FR); Edward Marmounier, Toulouse (FR)

(73) Assignee: Intel Corporation, Santa Clara, CA (US)

(*) Notice: Subject to any disclaimer, the term of this patent is extended or adjusted under 35 U.S.C. 154(b) by 117 days.

(21) Appl. No.: 16/320,286

(22) PCT Filed: Aug. 25, 2017

(86) PCT No.: PCT/IB2017/055123
§ 371 (c)(1),
(2) Date: Jan. 24, 2019

(87) PCT Pub. No.: WO2018/037380
PCT Pub. Date: Mar. 1, 2018

(65) Prior Publication Data
US 2019/0273673 A1 Sep. 5, 2019

(30) Foreign Application Priority Data
Aug. 25, 2016 (EP) .................................... 16306085

(51) Int. Cl.
*H04B 17/26* (2015.01)
*H04L 12/26* (2006.01)
(Continued)

(52) U.S. Cl.
CPC ......... *H04L 43/0894* (2013.01); *H04B 17/26* (2015.01); *H04L 43/50* (2013.01);
(Continued)

(58) Field of Classification Search
CPC .... H04W 24/00; H04L 43/08; H04L 43/0852; H04L 43/50; H04B 17/003
See application file for complete search history.

(56) References Cited

U.S. PATENT DOCUMENTS

| 4,451,916 A * | 5/1984 | Casper | H04B 10/25891 |
| | | | 714/4.3 |
| 6,856,812 B1 * | 2/2005 | Budka | H04W 52/20 |
| | | | 370/318 |

(Continued)

FOREIGN PATENT DOCUMENTS

| WO | 2007/044255 | 4/2007 |
| WO | WO2007/044255 | 4/2007 |

OTHER PUBLICATIONS

PCT Search Report and Written Opinion prepared for PCT/IB2017/055123, completed Sep. 27, 2017.

(Continued)

*Primary Examiner* — Hassan A Phillips
*Assistant Examiner* — Prenell P Jones
(74) *Attorney, Agent, or Firm* — Hanley, Flight & Zimmerman, LLC

(57) ABSTRACT

Technologies for link capability estimation are disclosed. A compute device may determine a maximum radio bitrate for a certain connection, such as an LTE connection to a specific cell antenna. The compute device may also determine a maximum downlink bitrate for that connection, and store both the maximum radio bitrate and the maximum downlink bitrate in a database on the compute device. At a later time, an application of the compute device may want to know an estimate of the current maximum downlink bitrate, such as for the purpose of selecting a bitrate in streaming a video. The compute device can determine the current maximum radio bitrate, and look for similar entries in the database.

(Continued)

Based on entries in the database, a link capability estimation can be determined and provided to the application.

25 Claims, 5 Drawing Sheets

(51) Int. Cl.
*H04W 24/10* (2009.01)
*H04W 24/00* (2009.01)
*H04W 24/02* (2009.01)

(52) U.S. Cl.
CPC ........... *H04W 24/00* (2013.01); *H04W 24/02* (2013.01); *H04W 24/10* (2013.01)

(56) References Cited

U.S. PATENT DOCUMENTS

| | | | | |
|---|---|---|---|---|
| 10,447,333 | B2* | 10/2019 | Hoirup | H04B 1/0458 |
| 2002/0157046 | A1* | 10/2002 | Kyosti | H04L 25/03019 |
| | | | | 714/704 |
| 2004/0146023 | A1* | 7/2004 | Pietraski | H04L 1/0016 |
| | | | | 370/333 |
| 2005/0232201 | A1* | 10/2005 | Bysted | H04L 1/203 |
| | | | | 370/332 |
| 2010/0118895 | A1* | 5/2010 | Radulescu | H04J 3/0667 |
| | | | | 370/503 |
| 2011/0019593 | A1* | 1/2011 | Stephen | H04W 76/40 |
| | | | | 370/260 |
| 2012/0106383 | A1 | 5/2012 | Gromley et al. | |
| 2013/0298170 | A1* | 11/2013 | ElArabawy | H04L 47/30 |
| | | | | 725/62 |
| 2014/0029455 | A1 | 1/2014 | Vitthaladevuni et al. | |
| 2015/0124605 | A1 | 5/2015 | Gholmieh et al. | |
| 2015/0172357 | A1* | 6/2015 | Olrog | H04L 67/28 |
| | | | | 709/203 |
| 2017/0026982 | A1* | 1/2017 | Koskinen | H04W 28/22 |
| 2018/0198482 | A1* | 7/2018 | Hoirup | H04B 1/401 |
| 2018/0234777 | A1* | 8/2018 | Roeck | H04R 25/30 |

OTHER PUBLICATIONS

Extended European search report for European patent application No. 16306085.8, dated Mar. 14, 2017 (8 pages).

Office action for European patent application No. 16306085.8, dated Mar. 26, 2019 (7 pages).

Office action for European patent application No. 16306085.8, dated Feb. 12, 2019 (5 pages).

European Patent Office, "Communication under Rule 71(3) EPC," mailed in connection with European Patent Application No. 16306085.8, dated Jan. 13, 2021, 30 pages.

* cited by examiner

TECHNOLOGIES FOR LINK CAPABILITY ESTIMATION

CROSS REFERENCE TO RELATED APPLICATIONS

The present application is a national stage entry under 35 USC § 371(b) of International Application No. PCT/IB2017/055123, filed Aug. 25, 2017.

BACKGROUND

Compute devices, such as cell phones, are increasingly used for bandwidth-intensive communication such as video streaming or video chat. In many cases, the bitrate used may be variable in order to allow for real-time video with a variety of network communication speeds.

Most modern cell phones are capable of high-speed communication, but real-world performance may depend on many factors such as distance from a cell tower antenna, obstructions, and other network traffic on the same cell tower. Because of the uncertainty of the actual bandwidth available to the cell phone for real-time video, the video may not begin streaming at the optimal bitrate. If the streaming bitrate is too low, the video quality is lower than necessary. If the bitrate streaming is too high, the video may not play for the end user in real-time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
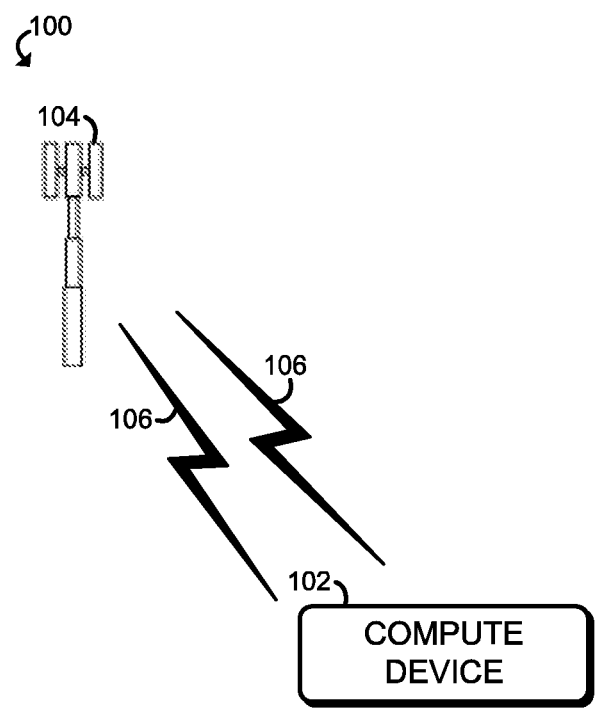
FIG. 1 is simplified block diagrams of at least one embodiment of a system for link capability estimation including a compute device in communication with a cell antenna.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system for link capability estimation 100 includes a compute device 102 and a cell antenna 104. The compute device 102 may communicate with the cell antenna 104 over one or more connections 106, and each connection 106 may be over the same or a different Radio Access Technology (RAT). In the illustrative embodiment, as described in more detail below, the compute device 102 determines a maximum radio bitrate of the connection 106 based on parameters of the connection 106, such as channel quality indicators. The compute device 102 also determines a maximum downlink bitrate, such as by monitoring the actual bitrate of the connection 106. The compute device 102 stores an indication of the maximum radio bitrate, the maximum downlink bitrate, the corresponding cell antenna 104, the corresponding RAT, and the time of analysis in a bitrate history database. At a later time, such as the next day, the compute device 102 may initialize a new connection 106 with the same cell antenna 104 and the same RAT. Based on the entry in the bitrate history database from the day before, the compute device 102 may determine a link capability estimation for the expected maximum downlink bitrate of the connection 106. The compute device 102 may then communicate across the connection 106 at this bitrate, such as by streaming a video at that bitrate.

The cell antenna 104 may be embodied as any type of antenna usable for networked communication, such as an antenna on a commercial cell tower. It should be appreciated that the cell antenna 104 need not be part of a commercial installation, on a tower, or even part of a "cell" (i.e., with a specific coverage area non-overlapping with other cells). For example, the cell antenna 104 could be embodied as a Wi-Fi® antenna, a Bluetooth® antenna, etc. The cell antenna 104 may include several physical antennae, such an antenna for each of several frequency bands or several antennae that may operate coherently to perform directional transmitting or receiving.

The connection 106 may be associated with any suitable RAT, and may be associated with any protocol and/or frequency band. For example, the connection 106 may be associated with one or more of General Packet Radio Server (GPRS), High Speed Downlink Packet Access (HSDPA), Long-Term Evolution (LTE), second-generation (2G), third-generation (3G), fourth-generation (4G), or fifth-generation (5G) cellular communication technology, Wi-Fi®, Bluetooth®, etc. It should be appreciated that the compute device 102 and the cell antenna 104 may, in some embodiments, be able to communicate over more than one RAT.

Figure 2:
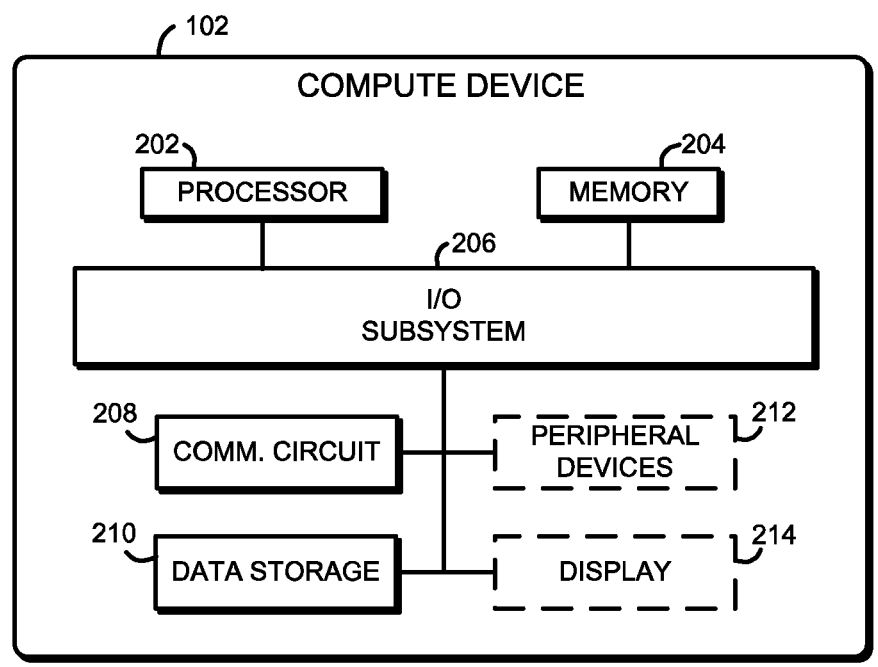
FIG. 2 is a simplified block diagram of at least one embodiment of the compute device of FIG. 1.

Referring now to FIG. 2, the illustrative compute device 102 may be embodied as any type of compute device capable of communicating with the cell antenna 104 and performing the functions described herein. For example, the compute device 102 may be embodied as or otherwise be included in, without limitation, a cellular phone, a smartphone, an embedded computing system, a System-on-a-Chip (SoC), a desktop computer, a server computer, a tablet computer, a notebook computer, a laptop computer, a wearable computer, a handset, a messaging device, a camera device, a multiprocessor system, a processor-based system, a consumer electronic device, and/or any other computing device. The illustrative compute device 102 includes a processor 202, a memory 204, an input/output (I/O) subsystem 206, a communication circuit 208, and data storage 210. In some embodiments, one or more of the illustrative components of the compute device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 102 on a single integrated circuit chip.

The communication circuit 208 may be embodied as any type of communication circuit, device, or collection thereof, capable of enabling communications between the compute device 102 and other devices, such as the cell antenna 104. To do so, the communication circuit 208 may be configured to use any one or more communication technology and associated protocols (e.g., GPRS, HSDPA, LTE, 2G, 3G, 4G, or 5G cellular communication technology, Wi-Fi®, Bluetooth®, near field communication (NFC), etc.) to effect such communication.

The data storage 210 may be embodied as any type of device or devices configured for the short-term or long-term storage of data. For example, the data storage 210 may include any one or more memory devices and circuits, memory cards, hard disk drives, solid-state drives, or other data storage devices.

Of course, in some embodiments, the compute device 102 may include other or additional components, such as those commonly found in a compute device. For example, the compute device 102 may also have peripheral devices 212 and/or a display 214. The peripheral devices 212 may include a keyboard, a mouse, etc.

The optional display 214 may be embodied as any type of display on which information may be displayed to a user of the compute device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
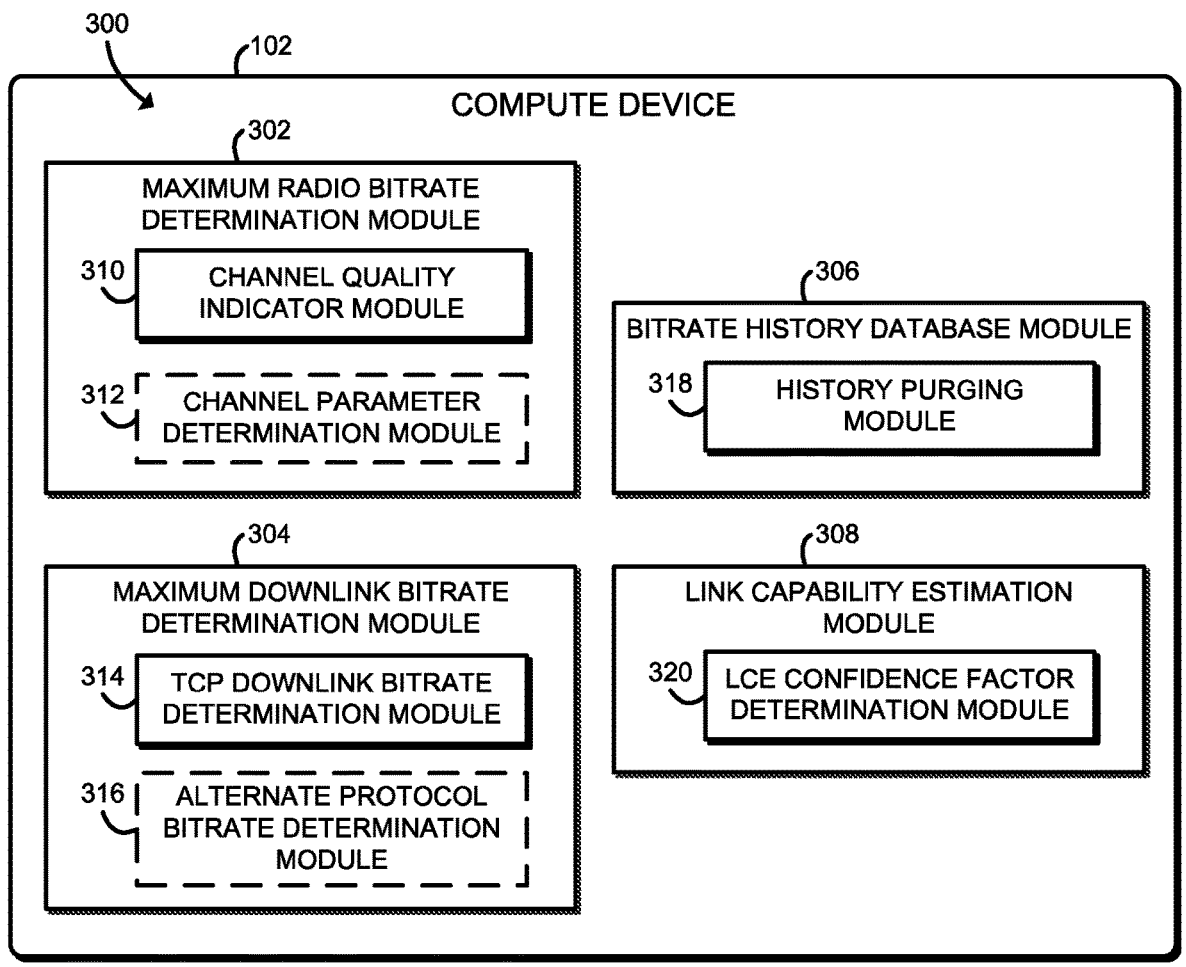
FIG. 3 is a block diagram of at least one embodiment of an environment that may be established by the compute device of FIG. 2.

Referring now to FIG. 3, in use, the compute device 102 may establish an environment 300. The illustrative environment 300 includes a maximum radio bitrate determination module 302, a maximum downlink bitrate determination module 304, a bitrate history database module 306, and a link capability estimation module 308. The various modules of the environment 300 may be embodied as hardware, software, firmware, or a combination thereof. For example, the various modules, logic, and other components of the environment 300 may form a portion of, or otherwise be established by, the processor 202 or other hardware components of the compute device 102. As such, in some embodiments, one or more of the modules of the environment 300 may be embodied as circuitry or collection of electrical devices (e.g., a maximum radio bitrate determination circuit 302, a maximum downlink bitrate determination circuit 304, a bitrate history database circuit 306, etc.). It should be appreciated that, in such embodiments, one or more of the circuits (e.g., the maximum radio bitrate determination circuit 302, the maximum downlink bitrate determination circuit 304, the bitrate history database circuit 306, etc.) may form a portion of one or more of the processor 202, the memory 204, the I/O subsystem 206, and/or the data storage 214. Additionally, in some embodiments, one or more of the illustrative modules may form a portion of another module and/or one or more of the illustrative modules may be independent of one another.

The maximum radio bitrate determination module 302 is configured to determine a maximum radio bitrate for a connection 106 between the compute device 102 and a cell antenna 104. As used in the present specification, the maximum radio bitrate refers to the maximum bitrate that could be transferred on the connection 106 with a given RAT at a given time, limited only by the properties of the connection 106 (e.g., signal strength, signal/noise ratio, etc.) In some embodiments, the maximum radio bitrate is determined based on a maximum bitrate that could be transferred with less than a given bit error rate, such as 10%. The maximum radio bitrate may be affected by factors such as distance from the cell antenna 104, a level of interference, obstructions such as trees or walls, rain, etc. It should be appreciated that the maximum radio bitrate does depend on the RAT (and associated protocol) of the connection 106, but does not depend on factors unrelated to the connection 106 or RAT, such as number of other compute devices 102 communicating with the same cell antenna 104 or a scheduling algorithm that may be associated with the cell antenna 104.

In the illustrative embodiment, the maximum radio bitrate determination module 302 determines the maximum radio bitrate using a standard associated with the corresponding RAT, such as by using a channel quality indicator module 310. The channel quality indicator module 310 is configured to determine a channel quality indicator using standardized metrics, which may be defined for certain RATs, such as HSDPA or LTE. Of course, in some embodiments, such as one in which standardized metrics are not defined for the current RAT, a channel parameter determination module 312 may determine one or more parameters of the connection 106 (such as signal strength and/or signal/noise ratio) which may then be used to determine the maximum radio bitrate. It should be appreciated that, in some embodiments, the maximum radio bitrate determination module 302 may only determine an indication of a maximum radio bitrate (such as a rating value of the connection 106), but may not explicitly determine a bitrate.

The maximum downlink bitrate determination module 304 is configured to determine a maximum downlink bitrate. As used in the present specification, a maximum downlink bitrate is the maximum available downlink bitrate of a connection 106 when that connection 106 is saturating the bandwidth available for the downlink, and therefore may be limited by factors such as the number of other compute devices 102 communicating with the cell antenna 104 and a scheduling algorithm associated with the cell antenna 104. In the illustrative embodiment, the maximum downlink bitrate determination module 304 determines the maximum downlink bitrate by monitoring a connection 106 established between the cell antenna 104 and the compute device 102 for another purpose, such as transferring data for an application. In some embodiments, the maximum downlink bitrate determination module 304 may initiate a connection 106 for the purpose of determining a maximum downlink bitrate. It should be appreciated that any given connection 106 may not be saturating the available downlink bitrate, such as if a lower downlink bitrate is all that is required. In that case, the maximum downlink bitrate determination module 304 may discard the determined downlink bitrate, since it would not be the maximum downlink bitrate.

The illustrative maximum downlink bitrate determination module 304 includes a transmission control protocol (TCP) downlink bitrate determination module 314, which is configured to determine a downlink bitrate of a connection 106 when that connection 106 is a TCP connection. It should be appreciated that the bitrate of a TCP connection starts out low and increases until packets begin to be dropped. Therefore, if no packets are being dropped and the bitrate of the connection 106 is not increasing, then the connection 106 is not saturating the available downlink. Similarly, if the bitrate of the connection 106 is increasing over time, then the connection 106 is not yet saturating the available downlink. If the connection 106 is occasionally dropping packets in a manner consistent with saturating the available downlink, then the connection 106 likely is saturating the available downlink, and the current bitrate of the TCP connection can be used as the maximum downlink bitrate. It should be appreciated that the TCP downlink bitrate determination module 314 may perform various calculations on the traffic of the connection 106 to determine if the current bitrate can be used as the maximum downlink bitrate, and that the calculations may depend on the specific version of TCP that is being implemented.

In some embodiments, such as ones in which TCP is not used, the maximum downlink bitrate determination module 304 includes an alternate protocol bitrate determination module 316. The alternate protocol bitrate determination module 316 may determine whether the current connection 106 is saturating the available bandwidth in a manner similar to that described above in regard to the TCP downlink bitrate determination module 314 as may be appropriate for the particular protocol in use.

The bitrate history database module 306 is configured to store entries, with each entry including a maximum downlink bitrate and an indication of a corresponding maximum radio bitrate, as well as the RAT used, the cell antenna 104 accessed, and the time the bitrates were determined. In some embodiments, only a single RAT may ever be used, and an indication of the RAT may not be explicitly included in entries of the bitrate history database module 306.

The bitrate history database module 306 includes a history purging module 318. The history purging module 318 is configured to delete entries from the bitrate history database module 306, such as when the entries have been in the bitrate history database module 306 for over a certain amount of time, which may vary based on the application.

The link capability estimation module 308 is configured to determine a link capability estimation (LCE) based on a maximum radio bitrate for the current connection 106 identified by entries in the bitrate history database module 306. The link capability estimation module 308 may determine the LCE as a function of the data in one or more entries of the bitrate history database module 306 using an equation or a formula, as described below in more detail in regard to FIG. 6. The link capability estimation module 308 includes a LCE confidence factor determination module 320 configured to determine a confidence factor of the determined LCE as a function of the data in one or more entries of the bitrate history database module 306 using an equation or a formula, as described below in more detail in regard to FIG. 6. It should be appreciated that, in some embodiments, a confidence factor may not always be determined or may not ever be determined.

Figure 4:
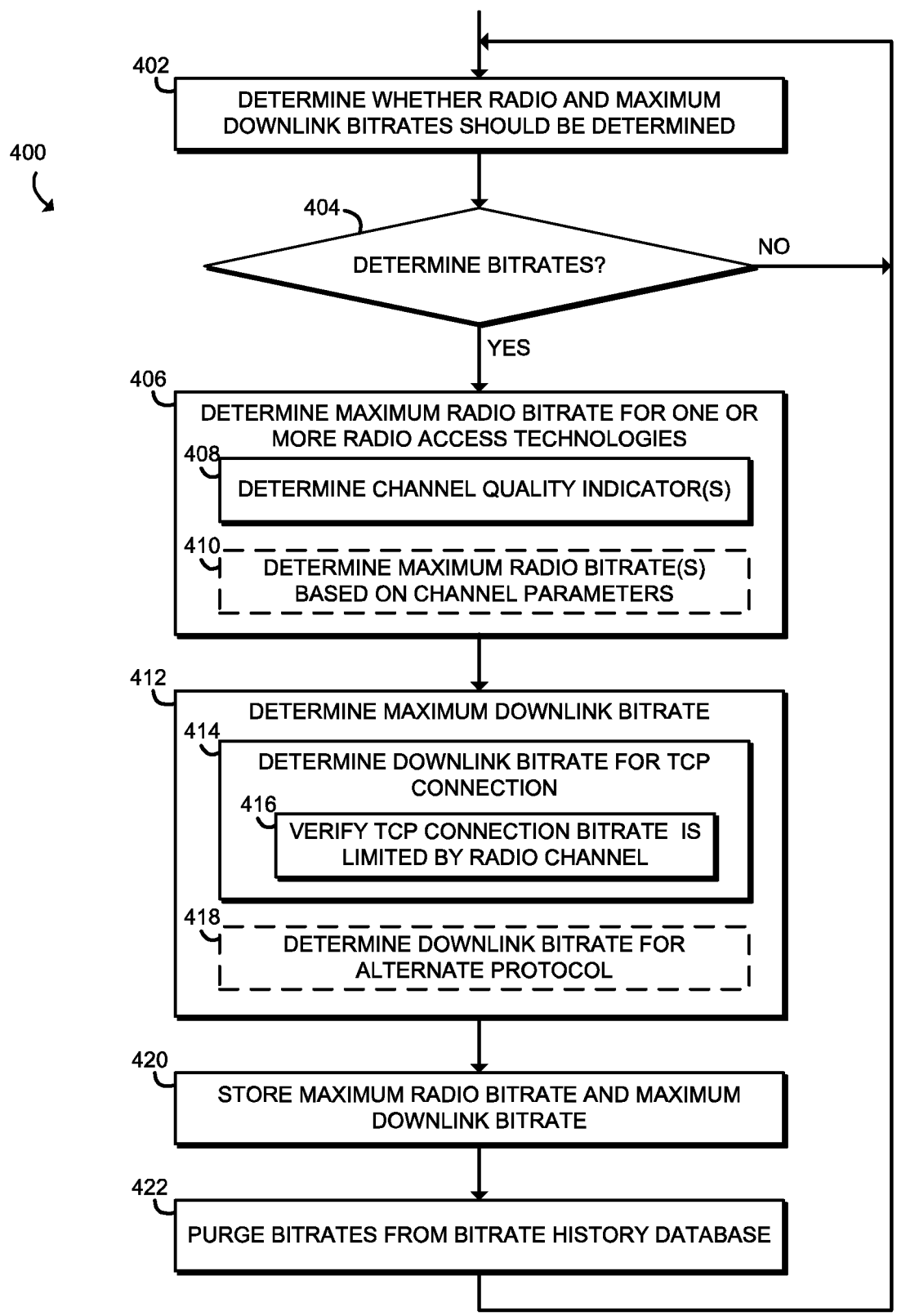
FIG. 4 is a simplified flow diagram of at least one embodiment of a method for storing bitrates in a bitrate history database by the compute device of FIG. 2.

Referring now to FIG. 4, in use, the compute device 102 may execute a method 400 for storing bitrates in a bitrate history database. The method 400 begins in block 402, in which the compute device 102 determines whether radio and maximum downlink bitrates should be determined. The compute device 102 may determine whether the radio and maximum downlink bitrates should be determined based on any factor, such as the amount of time since the radio and maximum downlink bitrates have been determined or that a new connection 106 has been made. In block 404, the compute device 102 jumps back to block 402 if the compute device 102 should not determine bitrates and proceeds to block 406 if the compute device 102 should determine bitrates.

In block 406, the compute device 102 determines a maximum radio bitrate for one or more RATs. In the illustrative embodiment, the compute device 102 determines a channel quality indicator for each of the one or more RATs in block 408 using standardized metrics. In some embodiments, the compute device 102 may determine a maximum radio bitrate based on channel parameters in a manner that does not rely on standard metrics in block 410.

In block 412, the compute device 102 determines a maximum downlink bitrate. In the illustrative embodiment, the compute device 102 determines a downlink bitrate for a TCP connection in block 416, and verifies that the TCP connection bitrate is limited by the available downlink bitrate. It should be appreciated that if it is determined that the downlink bitrate for the TCP connection is limited by a factor other than the maximum available downlink bitrate, the downlink bitrate may not be stored. In some embodiments, such as ones in which a protocol other than TCP is used, the compute device 102 determines a downlink bitrate for an alternate protocol in block 418, and also verifies that the connection of the alternate protocol is saturating the available downlink bitrate.

In block 420, the compute device 102 stores an indication of the maximum radio bitrate and the maximum downlink bitrate in the bitrate history database module 306, as well as the current RAT and the current cell antenna 104. In block 422, the compute device 102 purges bitrate entries from the bitrate history database module 306. The compute device 102 may purge (i.e., delete) entries that are older than a threshold amount of time, such as one day, one week, one month, etc. The compute device 102 may, in some embodiments, purge entries that have been rendered irrelevant or less relevant. For example, if there are several entries with for a given RAT, cell antenna 104, and maximum radio bitrate, the compute device 102 may purge one or more of the oldest such entries, even if those entries are not older than the threshold amount of time.

Figure 5:
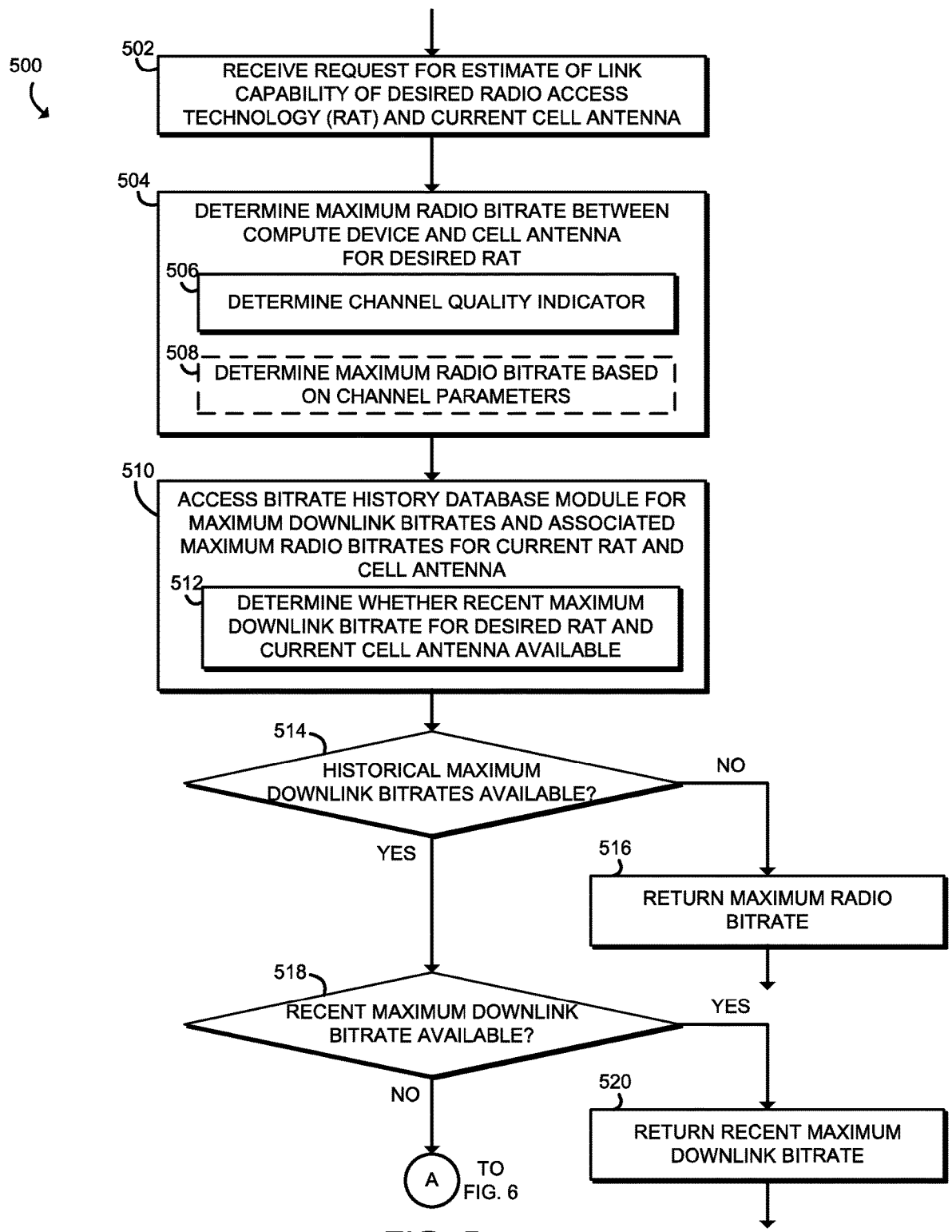
FIGS. 5 & 6 are simplified flow diagrams of at least one embodiment of a method for determining a link capability estimation by the compute device of FIG. 2.

Referring now to FIG. 5, in use, the compute device 102 may execute a method 500 for determining a link capability estimation. The method begins in block 502, in which the compute device 102 receives a request for an estimate of a link capacity of a desired RAT to a current cell antenna 104. The compute device 102 may receive such a request if, for example, an application is preparing to stream video and would like to know an estimate of the available downlink bitrate.

In block 504, the compute device 102 determines the maximum radio bitrate between the compute device 102 and the cell antenna 104 for the desired RAT. In the illustrative embodiment, the compute device 102 determines a channel quality indicator for the RAT in block 506 using standardized metrics. In some embodiments, the compute device 102 may determine a maximum radio bitrate based on channel parameters in a manner that does not rely on standard metrics in block 508.

In block 510, the compute device 102 accesses the bitrate history database module 306 for entries including maximum downlink bitrates and maximum radio bitrates for the desired RAT and current cell antenna 104. In block 512, the compute device 102 determines whether a recent maximum downlink bitrate for the desired RAT and current cell antenna 104 is available, such as a maximum downlink bitrate that was determined within the past 30 second, 1 minute, 5 minutes, 10 minutes, 30 minutes, or 60 minutes.

In block 514, if no historical maximum downlink bitrates are available for the current RAT and cell antenna 104, the method proceeds to block 516, and if historical maximum downlink bitrates are available for the current RAT and cell antenna 104, the method proceeds to block 518.

In block 516, the compute device 102 returns the maximum radio bitrate as the link capability estimation, as no other relevant information may be available. In some embodiments, the compute device 102 may also provide an indication that the provided link capability estimation has a low confidence factor, since it was not based on any historical information.

Figure 6:
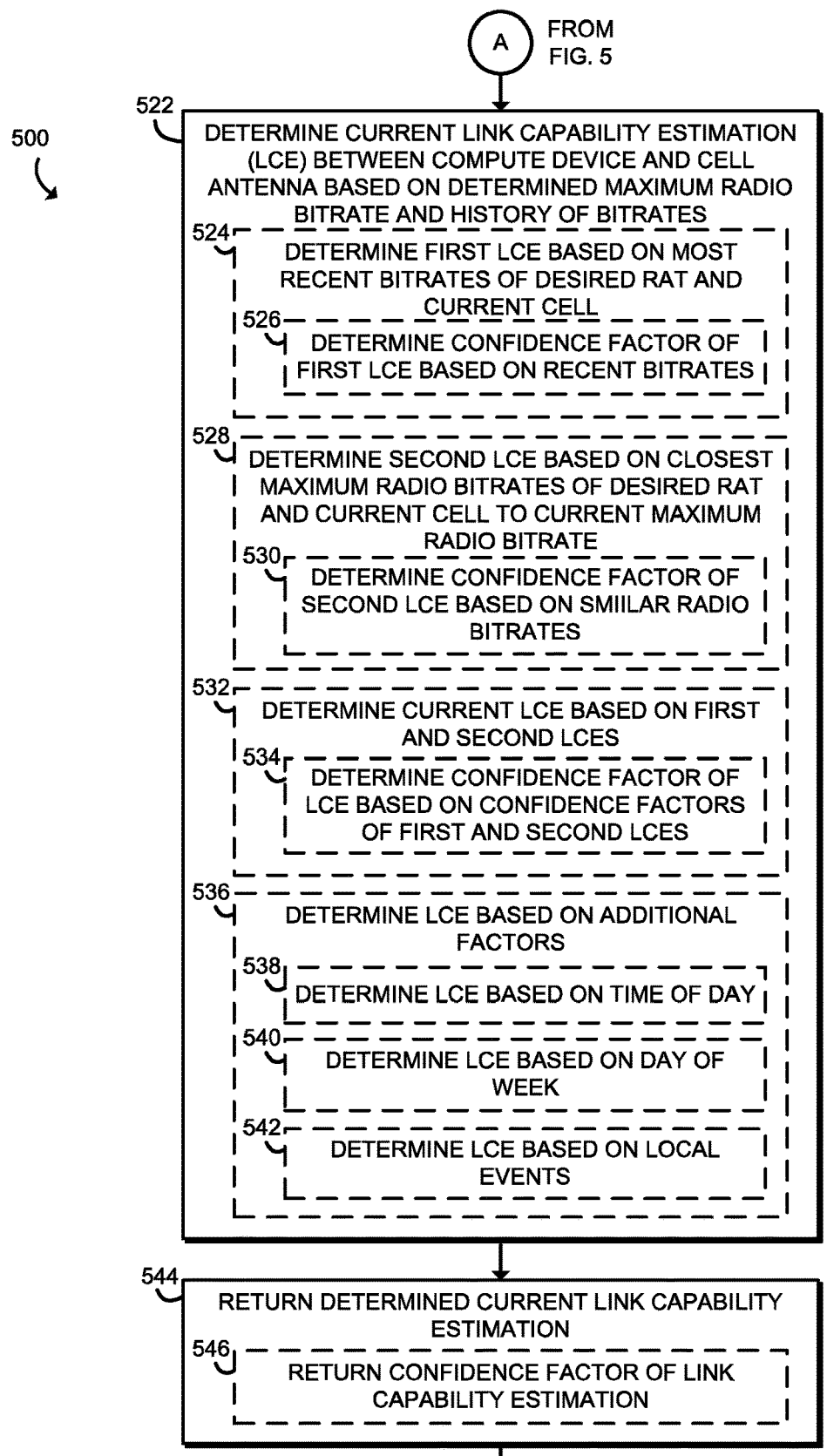

In block 518, if a recent maximum downlink bitrate is available, the method proceeds to block 520, and if a recent maximum downlink bitrate is not available, the method proceeds to block 522 in FIG. 6. In block 520, the compute device 102 returns the recent maximum downlink bitrate as the link capability estimation, which is likely still a good indicator of the present maximum downlink bitrate.

In block 522 of FIG. 6, the compute device 102 determines a current link capability estimation (LCE) of the link capability between the compute device 102 and the cell antenna 104 based on the maximum radio bitrate determined in block 504 and the entries of the bitrate history database module 306 accessed in block 508. The compute device 102 may determine the current LCE as a function of the data in one or more entries of the bitrate history database module 306 using an equation or a formula, such as by extrapolating or interpolating based on the entries of the bitrate history database module 306.

In one embodiment, in block 524, the compute device 102 may determine a first LCE based on the bitrates in the most recent entries associated with the current RAT and the current cell antenna 104. For example, if the most recent maximum radio bitrate is $MRBR_0$ and the second-most recent maximum radio bitrate is $MRBR_1$ with corresponding maximum downlink bitrates $DLBR_0$ and $DLBR_1$ and the current maximum radio bitrate is $MRBR_C$, the first LCE may be expressed as:

$$DLBR_0+(DLBR_1-DLBR_0)/(MRBR_1-MRBR_0)*(MRBR_C-MRBR_0).$$

In block 526, the compute device 102 may also determine a confidence factor corresponding to the first LCE based on the bitrates in the most recent entries associated with the current RAT and the current cell antenna 104. For example, the confidence factor may be expressed as:

$$1-(MRBR_C-MRBR_0)/MRBR_{Max},$$

where $MRBR_{Max}$ is the maximum value the maximum radio bitrate can be under the current RAT under ideal conditions.

In another embodiment, in block 528, the compute device 102 may determine a second LCE based on the bitrates in the entries associated with the current RAT and the current cell antenna 104 based on a similarity of the current maximum radio bitrate and the maximum radio bitrates of entries in the bitrate history database module 306. For example, if the maximum radio bitrate of the entry with the maximum radio bitrate closest to the current maximum radio bitrate is $MRBR_0$ and the maximum radio bitrate of the entry with maximum radio bitrate second-closest to the current maximum radio bitrate is $MRBR_1$ with corresponding maximum downlink bitrates $DLBR_0$ and $DLBR_1$ and the current maximum radio bitrate is $MRBR_C$, the second LCE may be expressed as:

$$DLBR_0+(DLBR_1-DLBR_0)/(MRBR_1-MRBR_0)*(MRBR_C-MRBR_0).$$

In block 526, the compute device 102 may also determine a confidence factor corresponding to the second LCE based on the bitrates in the most recent entries associated with the current RAT and the current cell antenna 104. For example, the confidence factor may be expressed as:

$$1-(T_C-T_0)/D,$$

where $T_C$ is the time associated with the current maximum radio bitrate, $T_0$ is the time associated with the maximum radio bitrate of the entry with the maximum bitrate closest to the current maximum radio bitrate, and D is the amount of time after which entries are purged from the bitrate history database module 306.

In yet another embodiment, in block 532, the compute device 102 may determine both the first LCE and the second LCE as described above in blocks 524 and 528, and determine the current LCE based on the first and second LCEs, such as by determining the mean or the quadratic mean of the first and second LCEs. Similarly, the compute device 102 may in block 534 determine a confidence factor based on the confidence factors described above in blocks 530 and 534, such as by determining the mean or the quadratic mean of those confidence factors.

It should be appreciated that, in some embodiments, additional factors may be considered in determining the current LCE in block 536. For example, the compute device 102 may determine the LCE based on the time of day in block 538, may determine the LCE based on the day of the week in block 540, and determine the LCE based on one or more local events such as a sporting event in block 542.

In block 544, the compute device 102 returns the determined current link capability estimation to the application that requested it. In block 546, the compute device 102 may optionally also return a confidence factor of the current LCE. It should be understood that, in the illustrative embodiment, that application may then initiate a connection 106 at a bitrate based on the determined current LCE and/or the confidence factor.

It should be appreciated that the present disclosure is not limited to the case in which the compute device 102 only relies on a history of bitrates determined by that same compute device 102. For example, the compute device 102 may receive bitrates from one or more other compute devices 102 and store those entries in the bitrate history database module 306. In some embodiments, the bitrate entries from several compute devices 102 may be stored on a server, and the compute device 102 may request a current LCE from the server by sending the server the desired RAT and current cell antenna 104. Additionally, it should be appreciated that in some embodiments the compute device 102 may perform the same functions described above for uplink bitrates instead of downlink bitrates, and/or for a combination of uplink and downlink bitrates.

EXAMPLES

Illustrative examples of the devices, systems, and methods disclosed herein are provided below. An embodiment of the devices, systems, and methods may include any one or more, and any combination of, the examples described below.

Example 1 includes a compute device for determination of a link capability estimation, the compute device comprising a maximum radio bitrate determination module to determine an indication of a current maximum radio bitrate between the compute device and a cell antenna for a desired radio access technology; and a link capability estimation module to access a previous maximum downlink bitrate stored in a bitrate history database based on the indication of the current maximum radio bitrate; and determine, based on the previous maximum downlink bitrate, the link capability estimation between the compute device and the cell antenna.

Example 2 includes the subject matter of Example 1, and wherein to access the previous maximum downlink bitrate in the bitrate history database comprises to access (i) a first previous maximum downlink bitrate and an associated first previous indication of a maximum radio bitrate based on a recency of a storage of the first previous maximum downlink bitrate and (ii) a second previous maximum downlink bitrate and an associated second previous indication of a maximum bitrate based on a recency of a storage of the second previous maximum downlink bitrate, and wherein to determine the link capability estimation comprises to infer a link capability estimation based on (i) the first previous maximum downlink bitrate and the associated first previous indication of the maximum radio bitrate, (ii) the second previous maximum downlink bitrate and the associated second previous indication of the maximum radio bitrate, and (iii) the indication of the current maximum radio bitrate.

Example 3 includes the subject matter of any of Examples 1 and 2, and wherein the link capability estimation module is further to determine a confidence factor of the link capability estimation based on (i) the first previous indication of the maximum radio bitrate associated with the first previous maximum downlink bitrate, (ii) the indication of the current maximum radio bitrate, and (iii) an indication of a maximum value of a radio bitrate associated with the desired radio access technology.

Example 4 includes the subject matter of any of Examples 1-3, and wherein to access the previous maximum downlink bitrate in the bitrate history database comprises to access (i) a first previous maximum downlink bitrate and an associated first previous indication of a maximum radio bitrate based on a similarity of the current maximum radio bitrate and the maximum radio bitrate associated with the first previous maximum downlink bitrate and (ii) a second previous maximum downlink bitrate and an associated second previous indication of a maximum bitrate based on a similarity of the current maximum radio bitrate and the maximum radio bitrate associated with the second previous maximum downlink bitrate, and wherein to determine the link capability estimation comprises to infer a link capability estimation based on (i) the first previous maximum downlink bitrate and the associated first previous indication of the maximum radio bitrate, (ii) the second previous maximum downlink bitrate and the associated second previous indication of the maximum radio bitrate, and (iii) the indication of the current maximum radio bitrate.

Example 5 includes the subject matter of any of Examples 1-4, and wherein the link capability estimation module is further to determine a confidence factor of the link capability estimation based on (i) a current time, (ii) a first time of analysis associated with the first previous maximum downlink bitrate, and (iii) an amount of time after which entries in the bitrate history database are purged.

Example 6 includes the subject matter of any of Examples 1-5, and wherein to access the previous maximum downlink bitrate in the bitrate history database comprises to access (i) a first previous maximum downlink bitrate and an associated first previous indication of a maximum radio bitrate based on a recency of a storage of the first previous maximum downlink bitrate, (ii) a second previous maximum downlink bitrate and an associated second previous indication of a maximum bitrate based on a recency of a storage of the second previous maximum downlink bitrate, (iii) a third previous maximum downlink bitrate and an associated third previous indication of a maximum radio bitrate based on a similarity of the current maximum radio bitrate and the maximum radio bitrate associated with the third previous maximum downlink bitrate, and (iv) a fourth previous maximum downlink bitrate and an associated fourth previous indication of a maximum bitrate based on a similarity of the current maximum radio bitrate and the maximum radio bitrate associated with the fourth previous maximum downlink bitrate, and wherein to determine the link capability estimation comprises to infer a link capability estimation based on (i) the first previous maximum downlink bitrate and the associated first previous indication of the maximum radio bitrate, (ii) the second previous maximum downlink bitrate and the associated second previous indication of the maximum radio bitrate, (iii) the third previous maximum downlink bitrate and the associated third previous indication of the maximum radio bitrate, (iv) the fourth previous maximum downlink bitrate and the associated fourth previous indication of the maximum radio bitrate, and (v) the indication of the current maximum radio bitrate.

Example 7 includes the subject matter of any of Examples 1-6, and wherein the link capability estimation module is further to determine a confidence factor of the link capability estimation based on (i) the first previous indication of the maximum radio bitrate associated with the first previous maximum downlink bitrate, (ii) the indication of the current maximum radio bitrate, (iii) an indication of a maximum value of a radio bitrate associated with the desired radio access technology, (iv) a current time, (v) a first time of analysis associated with the first previous maximum downlink bitrate, and (vi) an amount of time after which entries in the bitrate history database are purged.

Example 8 includes the subject matter of any of Examples 1-7, and wherein to determine the indication of the current maximum radio bitrate comprises to determine a channel quality indicator associated with a connection between the compute device and the cell antenna; and determine, based on the channel quality indicator, the indication of the current maximum radio bitrate.

Example 9 includes the subject matter of any of Examples 1-8, and wherein to determine the link capability estimation comprises to determine the link capability estimation further based on at least one of a time of day, a day of the week, and a local event.

Example 10 includes the subject matter of any of Examples 1-9, and further including a maximum downlink bitrate determination module to determine a current maximum downlink bitrate based on a current communication with the cell antenna with the desired radio access technology; and a bitrate history database module to store the current maximum downlink bitrate and the indication of the current maximum radio bitrate in the bitrate history database.

Example 11 includes the subject matter of any of Examples 1-10, and wherein the bitrate history database module is further to delete one or more entries in the bitrate history database based on a storage time of the one or more entries.

Example 12 includes the subject matter of any of Examples 1-11, and wherein to determine the current maximum downlink bitrate comprises to determine a current transmission control protocol (TCP) downlink bitrate of a TCP connection; determine whether the current TCP downlink bitrate is limited by the current maximum downlink bitrate; and determine, in response to a determination that the current TCP downlink bitrate is limited by the current maximum downlink bitrate, that the current maximum downlink bitrate is the current TCP downlink bitrate.

Example 13 includes the subject matter of any of Examples 1-12, and further including a bitrate history database module to receive, from a second compute device, a maximum downlink bitrate and an associated indication of the maximum radio bitrate between the second compute device and the cell antenna with the desired radio access technology; and store the maximum downlink bitrate and the indication of the maximum radio bitrate between the second compute device and the cell antenna in the bitrate history database.

Example 14 includes the subject matter of any of Examples 1-13, and wherein the link capability estimation module is further to select, based on the link capability estimation, a communication bitrate; and communicate, with the cell antenna, at the communication bitrate based on the link capability estimation.

Example 15 includes a method for determining a link capability estimation by a compute device, the method comprising determining, by the compute device, an indication of a current maximum radio bitrate between the compute device and a cell antenna for a desired radio access technology; accessing, by the compute device, a previous maximum downlink bitrate stored in a bitrate history database based on the indication of the current maximum radio bitrate; and determining, by the compute device and based on the previous maximum downlink bitrate, the link capability estimation between the compute device and the cell antenna.

Example 16 includes the subject matter of Example 15, and wherein accessing the previous maximum downlink bitrate in the bitrate history database comprises accessing (i) a first previous maximum downlink bitrate and an associated first previous indication of a maximum radio bitrate based on a recency of a storage of the first previous maximum downlink bitrate and (ii) a second previous maximum downlink bitrate and an associated second previous indication of a maximum bitrate based on a recency of a storage of the second previous maximum downlink bitrate, and wherein determining the link capability estimation comprises inferring a link capability estimation based on (i) the first previous maximum downlink bitrate and the associated first previous indication of the maximum radio bitrate, (ii) the second previous maximum downlink bitrate and the associated second previous indication of the maximum radio bitrate, and (iii) the indication of the current maximum radio bitrate.

Example 17 includes the subject matter of any of Examples 15 and 16, and further including determining, by the compute device, a confidence factor of the link capability estimation based on (i) the first previous indication of the maximum radio bitrate associated with the first previous maximum downlink bitrate, (ii) the indication of the current maximum radio bitrate, and (iii) an indication of a maximum value of a radio bitrate associated with the desired radio access technology.

Example 18 includes the subject matter of any of Examples 15-17, and wherein accessing the previous maximum downlink bitrate in the bitrate history database comprises accessing (i) a first previous maximum downlink bitrate and an associated first previous indication of a maximum radio bitrate based on a similarity of the current maximum radio bitrate and the maximum radio bitrate associated with the first previous maximum downlink bitrate and (ii) a second previous maximum downlink bitrate and an associated second previous indication of a maximum bitrate based on a similarity of the current maximum radio bitrate and the maximum radio bitrate associated with the second previous maximum downlink bitrate, and wherein determining the link capability estimation comprises inferring a link capability estimation based on (i) the first previous maximum downlink bitrate and the associated first previous indication of the maximum radio bitrate, (ii) the second previous maximum downlink bitrate and the associated second previous indication of the maximum radio bitrate, and (iii) the indication of the current maximum radio bitrate.

Example 19 includes the subject matter of any of Examples 15-18, and further including determining, by the compute device, a confidence factor of the link capability estimation based on (i) a current time, (ii) a first time of analysis associated with the first previous maximum downlink bitrate, and (iii) an amount of time after which entries in the bitrate history database are purged.

Example 20 includes the subject matter of any of Examples 15-19, and wherein accessing the previous maximum downlink bitrate in the bitrate history database comprises accessing (i) a first previous maximum downlink bitrate and an associated first previous indication of a maximum radio bitrate based on a recency of a storage of the first previous maximum downlink bitrate, (ii) a second previous maximum downlink bitrate and an associated second previous indication of a maximum bitrate based on a recency of a storage of the second previous maximum downlink bitrate, (iii) a third previous maximum downlink bitrate and an associated third previous indication of a maximum radio bitrate based on a similarity of the current maximum radio bitrate and the maximum radio bitrate associated with the third previous maximum downlink bitrate, and (iv) a fourth previous maximum downlink bitrate and an associated fourth previous indication of a maximum bitrate based on a similarity of the current maximum radio bitrate and the maximum radio bitrate associated with the fourth previous maximum downlink bitrate, and wherein determining the link capability estimation comprises inferring a link capability estimation based on (i) the first previous maximum downlink bitrate and the associated first previous indication of the maximum radio bitrate, (ii) the second previous maximum downlink bitrate and the associated second previous indication of the maximum radio bitrate, (iii) the third previous maximum downlink bitrate and the associated third previous indication of the maximum radio bitrate, (iv) the fourth previous maximum downlink bitrate and the associated fourth previous indication of the maximum radio bitrate, and (v) the indication of the current maximum radio bitrate.

Example 21 includes the subject matter of any of Examples 15-20, and further including determining, by the compute device, a confidence factor of the link capability estimation based on (i) the first previous indication of the maximum radio bitrate associated with the first previous maximum downlink bitrate, (ii) the indication of the current maximum radio bitrate, (iii) an indication of a maximum value of a radio bitrate associated with the desired radio access technology, (iv) a current time, (v) a first time of analysis associated with the first previous maximum downlink bitrate, and (vi) an amount of time after which entries in the bitrate history database are purged.

Example 22 includes the subject matter of any of Examples 15-21, and wherein determining the indication of the current maximum radio bitrate comprises determining, by the compute device, a channel quality indicator associated with a connection between the compute device and the cell antenna; and determining, by the compute device and based on the channel quality indicator, the indication of the current maximum radio bitrate.

Example 23 includes the subject matter of any of Examples 15-22, and wherein determining the link capability estimation comprises determining the link capability estimation further based on at least one of a time of day, a day of the week, and a local event.

Example 24 includes the subject matter of any of Examples 15-23, and further including determining, by the compute device, a current maximum downlink bitrate based on a current communication with the cell antenna with the desired radio access technology; and storing, by the compute device, the current maximum downlink bitrate and the indication of the current maximum radio bitrate in the bitrate history database.

Example 25 includes the subject matter of any of Examples 15-24, and further including deleting, by the compute device, one or more entries in the bitrate history database based on a storage time of the one or more entries.

Example 26 includes the subject matter of any of Examples 15-25, and wherein determining the current maximum downlink bitrate comprises determining, by the compute device, a current transmission control protocol (TCP) downlink bitrate of a TCP connection; determining, by the compute device, whether the current TCP downlink bitrate is limited by the current maximum downlink bitrate; and determining, by the compute device and in response to a determination that the current TCP downlink bitrate is limited by the current maximum downlink bitrate, that the current maximum downlink bitrate is the current TCP downlink bitrate.

Example 27 includes the subject matter of any of Examples 15-26, and further including receiving, by the compute device and from a second compute device, a maximum downlink bitrate and an associated indication of the maximum radio bitrate between the second compute device and the cell antenna with the desired radio access technology; and storing, by the compute device, the maximum downlink bitrate and the indication of the maximum radio bitrate between the second compute device and the cell antenna in the bitrate history database.

Example 28 includes the subject matter of any of Examples 15-27, and further including selecting, by the compute device and based on the link capability estimation, a communication bitrate; and communicating, by the compute device and with the cell antenna, at the communication bitrate based on the link capability estimation.

Example 29 includes one or more machine-readable media comprising a plurality of instructions stored thereon that, when executed, cause a compute device to perform the method of any of claims 15-28.

Example 30 includes a compute device for determination of a link capability estimation, the compute device comprising means for determining an indication of a current maximum radio bitrate between the compute device and a cell antenna for a desired radio access technology; means for accessing a previous maximum downlink bitrate stored in a bitrate history database based on the indication of the current maximum radio bitrate; and means for determining, based on the previous maximum downlink bitrate, the link capability estimation between the compute device and the cell antenna.

Example 31 includes the subject matter of Example 30, and wherein the means for accessing the previous maximum downlink bitrate in the bitrate history database comprises means for accessing (i) a first previous maximum downlink bitrate and an associated first previous indication of a maximum radio bitrate based on a recency of a storage of the first previous maximum downlink bitrate and (ii) a second previous maximum downlink bitrate and an associated second previous indication of a maximum bitrate based on a recency of a storage of the second previous maximum downlink bitrate, and wherein the means for determining the link capability estimation comprises means for inferring a link capability estimation based on (i) the first previous maximum downlink bitrate and the associated first previous indication of the maximum radio bitrate, (ii) the second previous maximum downlink bitrate and the associated second previous indication of the maximum radio bitrate, and (iii) the indication of the current maximum radio bitrate.

Example 32 includes the subject matter of any of Examples 30 and 31, and further including means for determining a confidence factor of the link capability estimation based on (i) the first previous indication of the maximum radio bitrate associated with the first previous maximum downlink bitrate, (ii) the indication of the current maximum radio bitrate, and (iii) an indication of a maximum value of a radio bitrate associated with the desired radio access technology.

Example 33 includes the subject matter of any of Examples 30-32, and wherein the means for accessing the previous maximum downlink bitrate in the bitrate history database comprises means for accessing (i) a first previous maximum downlink bitrate and an associated first previous indication of a maximum radio bitrate based on a similarity of the current maximum radio bitrate and the maximum radio bitrate associated with the first previous maximum downlink bitrate and (ii) a second previous maximum downlink bitrate and an associated second previous indication of a maximum bitrate based on a similarity of the current maximum radio bitrate and the maximum radio bitrate associated with the second previous maximum downlink bitrate, and wherein the means for determining the link capability estimation comprises means for inferring a link capability estimation based on (i) the first previous maximum downlink bitrate and the associated first previous indication of the maximum radio bitrate, (ii) the second previous maximum downlink bitrate and the associated second previous indication of the maximum radio bitrate, and (iii) the indication of the current maximum radio bitrate.

Example 34 includes the subject matter of any of Examples 30-33, and further including means for determining a confidence factor of the link capability estimation based on (i) a current time, (ii) a first time of analysis associated with the first previous maximum downlink bitrate, and (iii) an amount of time after which entries in the bitrate history database are purged.

Example 35 includes the subject matter of any of Examples 30-34, and wherein the means for accessing the previous maximum downlink bitrate in the bitrate history database comprises means for accessing (i) a first previous maximum downlink bitrate and an associated first previous indication of a maximum radio bitrate based on a recency of a storage of the first previous maximum downlink bitrate, (ii) a second previous maximum downlink bitrate and an associated second previous indication of a maximum bitrate based on a recency of a storage of the second previous maximum downlink bitrate, (iii) a third previous maximum downlink bitrate and an associated third previous indication of a maximum radio bitrate based on a similarity of the current maximum radio bitrate and the maximum radio bitrate associated with the third previous maximum downlink bitrate, and (iv) a fourth previous maximum downlink bitrate and an associated fourth previous indication of a maximum radio bitrate based on a similarity of the current maximum radio bitrate and the maximum radio bitrate associated with the fourth previous maximum downlink bitrate, and wherein the means for determining the link capability estimation comprises means for inferring a link capability estimation based on (i) the first previous maximum downlink bitrate and the associated first previous indication of the maximum radio bitrate, (ii) the second previous maximum downlink bitrate and the associated second previous indication of the maximum radio bitrate, (iii) the third previous maximum downlink bitrate and the associated third previous indication of the maximum radio bitrate, (iv) the fourth previous maximum downlink bitrate and the associated fourth previous indication of the maximum radio bitrate, and (v) the indication of the current maximum radio bitrate.

Example 36 includes the subject matter of any of Examples 30-35, and further including means for determining a confidence factor of the link capability estimation based on (i) the first previous indication of the maximum radio bitrate associated with the first previous maximum downlink bitrate, (ii) the indication of the current maximum radio bitrate, (iii) an indication of a maximum value of a radio bitrate associated with the desired radio access technology, (iv) a current time, (v) a first time of analysis associated with the first previous maximum downlink bitrate, and (vi) an amount of time after which entries in the bitrate history database are purged.

Example 37 includes the subject matter of any of Examples 30-36, and wherein the means for determining the indication of the current maximum radio bitrate comprises means for determining a channel quality indicator associated with a connection between the compute device and the cell antenna; and means for determining, based on the channel quality indicator, the indication of the current maximum radio bitrate.

Example 38 includes the subject matter of any of Examples 30-37, and wherein the means for determining the link capability estimation comprises means for determining the link capability estimation further based on at least one of a time of day, a day of the week, and a local event.

Example 39 includes the subject matter of any of Examples 30-38, and further including means for determining a current maximum downlink bitrate based on a current communication with the cell antenna with the desired radio access technology; and means for storing the current maximum downlink bitrate and the indication of the current maximum radio bitrate in the bitrate history database.

Example 40 includes the subject matter of any of Examples 30-39, and further including means for deleting one or more entries in the bitrate history database based on a storage time of the one or more entries.

Example 41 includes the subject matter of any of Examples 30-40, and wherein the means for determining the current maximum downlink bitrate comprises means for determining a current transmission control protocol (TCP) downlink bitrate of a TCP connection; means for determining whether the current TCP downlink bitrate is limited by the current maximum downlink bitrate; and means for determining, in response to a determination that the current TCP downlink bitrate is limited by the current maximum downlink bitrate, that the current maximum downlink bitrate is the current TCP downlink bitrate.

Example 42 includes the subject matter of any of Examples 30-41, and further including means for receiving, from a second compute device, a maximum downlink bitrate and an associated indication of the maximum radio bitrate between the second compute device and the cell antenna with the desired radio access technology; and means for storing the maximum downlink bitrate and the indication of the maximum radio bitrate between the second compute device and the cell antenna in the bitrate history database.

Example 43 includes the subject matter of any of Examples 30-42, and further including means for selecting, based on the link capability estimation, a communication bitrate; and means for communicating, with the cell antenna, at the communication bitrate based on the link capability estimation.

The invention claimed is:

1. A compute device to determine a link capability estimation, the compute device comprising:
   a maximum radio bitrate determination circuit to determine a current maximum radio bitrate value corresponding to a connection between the compute device and a cell antenna for a radio access technology;
   a maximum downlink bitrate determination circuit to, in response to detecting saturation of an available downlink bandwidth of the connection, determine a current maximum downlink bitrate value; and
   a link capability estimation circuit to:
      access a previous maximum downlink bitrate value stored in a bitrate history database based on the current maximum radio bitrate value; and
      determine, based on the previous maximum downlink bitrate value, the link capability estimation between the compute device and the cell antenna.

2. The compute device of claim 1, wherein the link capability estimation circuit is to access (i) a first previous maximum downlink bitrate value and an associated first previous maximum radio bitrate value based on a recency of a storage of the first previous maximum downlink bitrate value, and (ii) a second previous maximum downlink bitrate value and an associated second previous maximum radio bitrate value based on a recency of a storage of the second previous maximum downlink bitrate value, and
   infer the link capability estimation based on (i) the first previous maximum downlink bitrate value and the associated first previous maximum radio bitrate value, (ii) the second previous maximum downlink bitrate value and the associated second previous maximum radio bitrate value, and (iii) the current maximum radio bitrate value.

3. The compute device of claim 2, wherein the link capability estimation circuit is further to determine a confidence factor of the link capability estimation based on (i) the first previous maximum radio bitrate value associated with the first previous maximum downlink bitrate value, (ii) the current maximum radio bitrate value, and (iii) a maximum radio bitrate associated with the radio access technology.

4. The compute device of claim 1, wherein the link capability estimation circuit is to access (i) a first previous maximum downlink bitrate value and an associated first previous maximum radio bitrate value based on a similarity of the current maximum radio bitrate value and the first previous maximum radio bitrate value associated with the first previous maximum downlink bitrate value and (ii) a second previous maximum downlink bitrate value and an associated second previous maximum radio bitrate value based on a similarity of the current maximum radio bitrate value and the second previous maximum radio bitrate value associated with the second previous maximum downlink bitrate value, and
   infer the link capability estimation based on (i) the first previous maximum downlink bitrate value and the associated first previous maximum radio bitrate value, (ii) the second previous maximum downlink bitrate value and the associated second previous maximum radio bitrate value, and (iii) the current maximum radio bitrate value.

5. The compute device of claim 4, wherein the link capability estimation circuit is further to determine a confidence factor of the link capability estimation based on (i) a current time, (ii) a first time of analysis associated with the first previous maximum downlink bitrate value, and (iii) an amount of time after which entries in the bitrate history database are purged.

6. The compute device of claim 1, wherein the link capability estimation circuit is to access (i) a first previous maximum downlink bitrate value and an associated first previous maximum radio bitrate value based on a recency of a storage of the first previous maximum downlink bitrate value, (ii) a second previous maximum downlink bitrate value and an associated second previous maximum radio bitrate value based on a recency of a storage of the second previous maximum downlink bitrate value, (iii) a third previous maximum downlink bitrate value and an associated third previous maximum radio bitrate value based on a similarity of the current maximum radio bitrate value and the third previous maximum radio bitrate value associated with the third previous maximum downlink bitrate value, and (iv) a fourth previous maximum downlink bitrate value and an associated fourth previous maximum radio bitrate value based on a similarity of the current maximum radio bitrate value and the fourth previous maximum radio bitrate value associated with the fourth previous maximum downlink bitrate value, and
   to infer the link capability estimation based on (i) the first previous maximum downlink bitrate value and the associated first previous maximum radio bitrate value, (ii) the second previous maximum downlink bitrate value and the associated second previous maximum radio bitrate value, (iii) the third previous maximum downlink bitrate value and the associated third previous maximum radio bitrate value, (iv) the fourth previous maximum downlink bitrate value and the associated fourth previous maximum radio bitrate value, and (v) the current maximum radio bitrate value.

7. The compute device of claim 6, wherein the link capability estimation circuit is further to determine a confidence factor of the link capability estimation based on (i) the first previous maximum radio bitrate value associated with the first previous maximum downlink bitrate value, (ii) the current maximum radio bitrate value, (iii) a maximum radio bitrate associated with the radio access technology, (iv) a current time, (v) a first time of analysis associated with the first previous maximum downlink bitrate value, and (vi) an amount of time after which entries in the bitrate history database are purged.

8. The compute device of claim 1, further including
   a bitrate history database circuit to store the current maximum downlink bitrate value and the current maximum radio bitrate value in the bitrate history database.

9. The compute device of claim 1, further including a bitrate history database circuit to:
   receive, from a second compute device, a maximum downlink bitrate value and an associated maximum radio bitrate value corresponding to a second connection between the second compute device and the cell antenna with the radio access technology; and
   store the maximum downlink bitrate value and the associated maximum radio bitrate value between the second compute device and the cell antenna in the bitrate history database.

10. A method to determine a link capability estimation by a compute device, the method comprising:
- determining, by the compute device, a current maximum radio bitrate value corresponding to a connection between the compute device and a cell antenna for a radio access technology;
- in response to detecting saturation of an available downlink bandwidth of the connection, determining, by the compute device, a current maximum downlink bitrate value;
- accessing, by the compute device, a previous maximum downlink bitrate value stored in a bitrate history database based on the current maximum radio bitrate value; and
- determining, by the compute device and based on the previous maximum downlink bitrate value, the link capability estimation between the compute device and the cell antenna.

11. The method of claim 10, further including accessing (i) a first previous maximum downlink bitrate value and an associated first previous maximum radio bitrate value based on a recency of a storage of the first previous maximum downlink bitrate value and (ii) a second previous maximum downlink bitrate value and an associated second previous maximum radio bitrate value based on a recency of a storage of the second previous maximum downlink bitrate value, and
- inferring the link capability estimation based on (i) the first previous maximum downlink bitrate value and the associated first previous maximum radio bitrate value, (ii) the second previous maximum downlink bitrate value and the associated second previous maximum radio bitrate value, and (iii) the current maximum radio bitrate value.

12. The method of claim 11, further including determining, by the compute device, a confidence factor of the link capability estimation based on (i) the first previous maximum radio bitrate value associated with the first previous maximum downlink bitrate value, (ii) the current maximum radio bitrate value, and (iii) a maximum radio bitrate value associated with the radio access technology.

13. The method of claim 10, further including accessing (i) a first previous maximum downlink bitrate value and an associated first previous maximum radio bitrate value based on a similarity of the current maximum radio bitrate value and the first previous maximum radio bitrate value associated with the first previous maximum downlink bitrate value and (ii) a second previous maximum downlink bitrate value and an associated second previous maximum radio bitrate value based on a similarity of the current maximum radio bitrate value and the second previous maximum radio bitrate value associated with the second previous maximum downlink bitrate value, and
- inferring the link capability estimation based on (i) the first previous maximum downlink bitrate value and the associated first previous maximum radio bitrate, (ii) the second previous maximum downlink bitrate value and the associated second previous maximum radio bitrate value, and (iii) the current maximum radio bitrate value.

14. The method of claim 13, further including determining, by the compute device, a confidence factor of the link capability estimation based on (i) a current time, (ii) a first time of analysis associated with the first previous maximum downlink bitrate value, and (iii) an amount of time after which entries in the bitrate history database are purged.

15. The method of claim 10, further including accessing (i) a first previous maximum downlink bitrate value and an associated first previous maximum radio bitrate value based on a recency of a storage of the first previous maximum downlink bitrate value, (ii) a second previous maximum downlink bitrate value and an associated second previous maximum radio bitrate value based on a recency of a storage of the second previous maximum downlink bitrate value, (iii) a third previous maximum downlink bitrate value and an associated third previous maximum radio bitrate value based on a similarity of the current maximum radio bitrate value and the third previous maximum radio bitrate value associated with the third previous maximum downlink bitrate value, and (iv) a fourth previous maximum downlink bitrate value and an associated fourth previous maximum radio bitrate value based on a similarity of the current maximum radio bitrate value and the fourth previous maximum radio bitrate value associated with the fourth previous maximum downlink bitrate value, and
- inferring the link capability estimation based on (i) the first previous maximum downlink bitrate value and the associated first previous maximum radio bitrate value, (ii) the second previous maximum downlink bitrate value and the associated second previous maximum radio bitrate value, (iii) the third previous maximum downlink bitrate value and the associated third previous maximum radio bitrate value, (iv) the fourth previous maximum downlink bitrate value and the associated fourth previous maximum radio bitrate value, and (v) the current maximum radio bitrate value.

16. The method of claim 15, further including determining, by the compute device, a confidence factor of the link capability estimation based on (i) the first previous maximum radio bitrate value associated with the first previous maximum downlink bitrate value, (ii) the current maximum radio bitrate value, (iii) a maximum radio bitrate value associated with the radio access technology, (iv) a current time, (v) a first time of analysis associated with the first previous maximum downlink bitrate value, and (vi) an amount of time after which entries in the bitrate history database are purged.

17. The method of claim 10, further including:
- storing, by the compute device, the current maximum downlink bitrate value and the current maximum radio bitrate value in the bitrate history database.

18. One or more non-transitory computer-readable medium comprising instructions stored thereon that, when executed, cause a compute device to:
- determine a current maximum radio bitrate value corresponding to a connection between the compute device and a cell antenna for a radio access technology;
- in response to detecting saturation of an available downlink bandwidth of the connection, determine a current maximum downlink bitrate value;
- access a previous maximum downlink bitrate value stored in a bitrate history database based on the current maximum radio bitrate value; and
- determine, based on the previous maximum downlink bitrate value, a link capability estimation between the compute device and the cell antenna.

19. The one or more non-transitory computer-readable medium of claim 18, wherein the instructions further cause the compute device to access (i) a first previous maximum downlink bitrate value and an associated first previous maximum radio bitrate value based on a recency of a storage of the first previous maximum downlink bitrate value and (ii) a second previous maximum downlink bitrate value and an associated second previous maximum radio bitrate value based on a recency of a storage of the second previous maximum downlink bitrate value, and to infer the link capability estimation based on (i) the first previous maximum downlink bitrate value and the associated first previous maximum radio bitrate value, (ii) the second previous maximum downlink bitrate value and the associated second previous maximum radio bitrate value, and (iii) the current maximum radio bitrate value.

20. The one or more non-transitory computer-readable medium of claim 19, wherein the instructions further cause the compute device to determine a confidence factor of the link capability estimation based on (i) the first previous maximum radio bitrate value associated with the first previous maximum downlink bitrate value, (ii) the current maximum radio bitrate value, and (iii) a maximum radio bitrate value associated with the radio access technology.

21. The one or more non-transitory computer-readable medium of claim 18, wherein the instructions further cause the compute device to access (i) a first previous maximum downlink bitrate value and an associated first previous maximum radio bitrate value based on a similarity of the current maximum radio bitrate value and the first previous maximum radio bitrate value associated with the first previous maximum downlink bitrate value and (ii) a second previous maximum downlink bitrate value and an associated second previous maximum radio bitrate value based on a similarity of the current maximum radio bitrate value and the second previous maximum radio bitrate value associated with the second previous maximum downlink bitrate value, and to infer the link capability estimation based on (i) the first previous maximum downlink bitrate value and the associated first previous maximum radio bitrate value, (ii) the second previous maximum downlink bitrate value and the associated second previous maximum radio bitrate value, and (iii) the current maximum radio bitrate value.

22. The one or more non-transitory computer-readable medium of claim 21, wherein the instructions further cause the compute device to determine a confidence factor of the link capability estimation based on (i) a current time, (ii) a first time of analysis associated with the first previous maximum downlink bitrate value, and (iii) an amount of time after which entries in the bitrate history database are purged.

23. The one or more non-transitory computer-readable medium of claim 18, wherein the instructions further cause the compute device to access (i) a first previous maximum downlink bitrate value and an associated first previous maximum radio bitrate value based on a recency of a storage of the first previous maximum downlink bitrate value, (ii) a second previous maximum downlink bitrate value and an associated second previous maximum radio bitrate value based on a recency of a storage of the second previous maximum downlink bitrate value, (iii) a third previous maximum downlink bitrate value and an associated third previous maximum radio bitrate value based on a similarity of the current maximum radio bitrate value and the third previous maximum radio bitrate value associated with the third previous maximum downlink bitrate value, and (iv) a fourth previous maximum downlink bitrate value and an associated fourth previous maximum radio bitrate value based on a similarity of the current maximum radio bitrate value and the fourth previous maximum radio bitrate value associated with the fourth previous maximum downlink bitrate value, and to infer the link capability estimation based on (i) the first previous maximum downlink bitrate value and the associated first previous maximum radio bitrate value, (ii) the second previous maximum downlink bitrate value and the associated second previous maximum radio bitrate value, (iii) the third previous maximum downlink bitrate value and the associated third previous maximum radio bitrate value, (iv) the fourth previous maximum downlink bitrate value and the associated fourth previous maximum radio bitrate value, and (v) the current maximum radio bitrate value.

24. The one or more non-transitory computer-readable medium of claim 23, wherein the instructions further cause the compute device to determine a confidence factor of the link capability estimation based on (i) the first previous maximum radio bitrate value associated with the first previous maximum downlink bitrate value, (ii) the current maximum radio bitrate value, (iii) a maximum radio bitrate value associated with the radio access technology, (iv) a current time, (v) a first time of analysis associated with the first previous maximum downlink bitrate value, and (vi) an amount of time after which entries in the bitrate history database are purged.

25. The one or more non-transitory computer-readable medium of claim 18, wherein the instructions further cause the compute device to:

store the current maximum downlink bitrate value and the current maximum radio bitrate value in the bitrate history database.

\* \* \* \* \*